(12) United States Patent
Pang et al.

(10) Patent No.: US 10,844,543 B2
(45) Date of Patent: Nov. 24, 2020

(54) OIL, GREASE, AND MOISTURE RESISTANT PAPERBOARD HAVING A NATURAL APPEARANCE

(71) Applicant: WestRock MWV, LLC, Atlanta, GA (US)

(72) Inventors: Jiebin Pang, Glen Allen, VA (US); Scott J. Reigel, Columbus, GA (US); Natasha G. Melton, Richmond, VA (US); Teresa Krug, Henrico, VA (US); Steven Parker, Raleigh, NC (US); Terry Clark, Columbus, GA (US)

(73) Assignee: WestRock MWV, LLC, Atlanta, GA (US)

( * ) Notice: Subject to any disclaimer, the term of this patent is extended or adjusted under 35 U.S.C. 154(b) by 223 days.

(21) Appl. No.: 15/963,620

(22) Filed: Apr. 26, 2018

(65) Prior Publication Data

US 2019/0127917 A1    May 2, 2019

Related U.S. Application Data

(60) Provisional application No. 62/490,920, filed on Apr. 27, 2017.

(51) Int. Cl.
| | |
|---|---|
| *D21H 19/58* | (2006.01) |
| *D21H 19/38* | (2006.01) |
| *D21H 19/40* | (2006.01) |
| *D21H 19/82* | (2006.01) |
| *D21H 19/50* | (2006.01) |
| *D21H 21/52* | (2006.01) |
| *D21H 19/66* | (2006.01) |
| *D21H 19/60* | (2006.01) |
| *D21H 21/14* | (2006.01) |
| *D21H 27/10* | (2006.01) |

(52) U.S. Cl.
CPC .......... *D21H 19/58* (2013.01); *D21H 19/385* (2013.01); *D21H 19/40* (2013.01); *D21H 19/50* (2013.01); *D21H 19/60* (2013.01); *D21H 19/66* (2013.01); *D21H 19/822* (2013.01); *D21H 21/14* (2013.01); *D21H 21/52* (2013.01); *D21H 27/10* (2013.01)

(58) Field of Classification Search
None
See application file for complete search history.

(56) References Cited

U.S. PATENT DOCUMENTS

| | | | | |
|---|---|---|---|---|
| 4,265,969 A | * | 5/1981 | Yasuda | D21H 19/822 427/358 |
| 4,898,752 A | | 2/1990 | Cavagna | |
| 5,989,724 A | * | 11/1999 | Wittosch | B65D 65/42 428/511 |
| 6,545,079 B1 | * | 4/2003 | Nurmi | D21H 27/10 428/496 |

(Continued)

FOREIGN PATENT DOCUMENTS

| | | |
|---|---|---|
| EP | 0718437 A1 | 6/1996 |
| EP | 2514868 A1 | 10/2012 |
| WO | WO2018/094130 A1 | 5/2018 |

*Primary Examiner* — Chinessa T. Golden
(74) *Attorney, Agent, or Firm* — Walters & Wasylyna LLC

(57) ABSTRACT

A coated paperboard having a natural appearance is disclosed which includes a barrier coating containing substantially no fluorochemical or wax, exhibiting good resistance to oil, grease, and moisture and having no tendency toward blocking.

26 Claims, 7 Drawing Sheets

L-a-b color values for coated samples

(56) References Cited

U.S. PATENT DOCUMENTS

| | | | |
|---|---|---|---|
| 2003/0039854 A1* | 2/2003 | Drewery | D21H 19/58 |
| | | | 428/511 |
| 2004/0161594 A1 | 8/2004 | Joyce | |
| 2004/0241475 A1 | 12/2004 | Morabito | |
| 2005/0112387 A1 | 5/2005 | Druckrey | |
| 2005/0260428 A1 | 11/2005 | Song | |
| 2009/0239047 A1* | 9/2009 | Fugitt | D21H 19/36 |
| | | | 428/207 |
| 2010/0266819 A1 | 10/2010 | Bushhouse | |
| 2011/0244258 A1* | 10/2011 | Vonfelden | C09D 167/02 |
| | | | 428/514 |
| 2016/0230343 A1 | 8/2016 | Pang | |
| 2017/0002517 A1 | 1/2017 | Pang | |

\* cited by examiner

OIL, GREASE, AND MOISTURE RESISTANT PAPERBOARD HAVING A NATURAL APPEARANCE

BACKGROUND OF THE INVENTION

Field of Invention

This disclosure relates to paperboard substrates having oil, grease, and moisture resistance while having a natural appearance and while remaining highly repulpable and without having a tendency toward blocking.

Description of the Related Art

Sustainable packages using renewable, recyclable, and/or compostable materials are increasingly and strongly desired for food service and food packaging. Paper or paperboard itself is one of the most sustainable materials for packaging applications; however, paper or paperboard is often coated or laminated with barrier materials to fulfill the requirements of packaging. These additional barrier coatings or films often make the finished packages no longer repulpable or compostable. For example, widely used polyethylene coated paperboard is neither compostable nor recyclable under typical conditions. Polylactide coated paperboard can be compostable under industrial conditions, but it is not recyclable.

Oil and grease resistance is one of the top needs for paperboard packages in food and food service industries. Several technologies including specialty chemical (wax, fluorochemicals, starch, polyvinyl alcohol (PVOH), sodium alginate, etc.) treatment, polymer extrusion coating (polyethylene, etc.) have been employed to provide oil and grease resistance of paperboard packaging. However, the paper or paperboard treated with wax or coated with polyethylene, which is currently used in oil and grease resistant packaging, has difficulties in repulping. Paper or paperboard treated with specialty chemicals such as fluorochemicals has potential health, safety and environmental concerns, and scientists have called for a stop to non-essential use of fluorochemicals in common consumer products including packaging materials. Aqueous coating is one of the promising solutions to achieve these goals, particularly if the coated paperboard is highly repulpable.

Packaging and other paper products with a natural, brown appearance have increasingly become preferred by retailers and brand owners to convey an environmental message. However, traditional coatings for application to unbleached kraft paperboard are designed to provide a white surface on which packaging graphics are typically printed. While it is possible to form packages from uncoated stock, the resulting packages will have little or no oil, grease, or moisture resistance. On the other hand, polyethylene, fluorochemical or wax-based coatings and the like can allow the unbleached fiber to be seen, but are subject to the various disadvantages discussed above.

There is a need for oil, grease, and moisture resistant, natural-appearing paperboard that avoids environmental or safety concerns.

SUMMARY OF THE INVENTION

The general purpose of the invention is to provide an oil, grease, and moisture barrier on unbleached paperboard by applying one or more layers of aqueous coating without fluorochemicals or wax. The coating can either be applied on a paper machine or by an off-line coater. Paperboard coated according to the invention provides resistance to oil, grease and moisture, does not have any tendency to block, is compliant to safety and environmental regulations, has good repulpability, exhibits a natural appearance, and can be produced at a low cost.

In one embodiment, a coated unbleached paperboard is disclosed which includes an unbleached paperboard substrate having a first side and a second side; and a first coating in contact with the first side, the first coating having a coat weight from about 6 to 14 lbs per 3000 ft2 and comprising binder and pigment, the first coating containing substantially no fluorochemical or wax. The binder to pigment ratio in the first coating may be in a range of 30 to 50 parts binder per 100 parts pigment, by weight.

A second coating may be applied over the first coating, the second coating also containing substantially no fluorochemical or wax. The coated paperboard provides barrier properties to at least one of oil, grease, and moisture; and may be at least 98.5% repulpable.

DETAILED DESCRIPTION OF THE INVENTION

Figure 1:
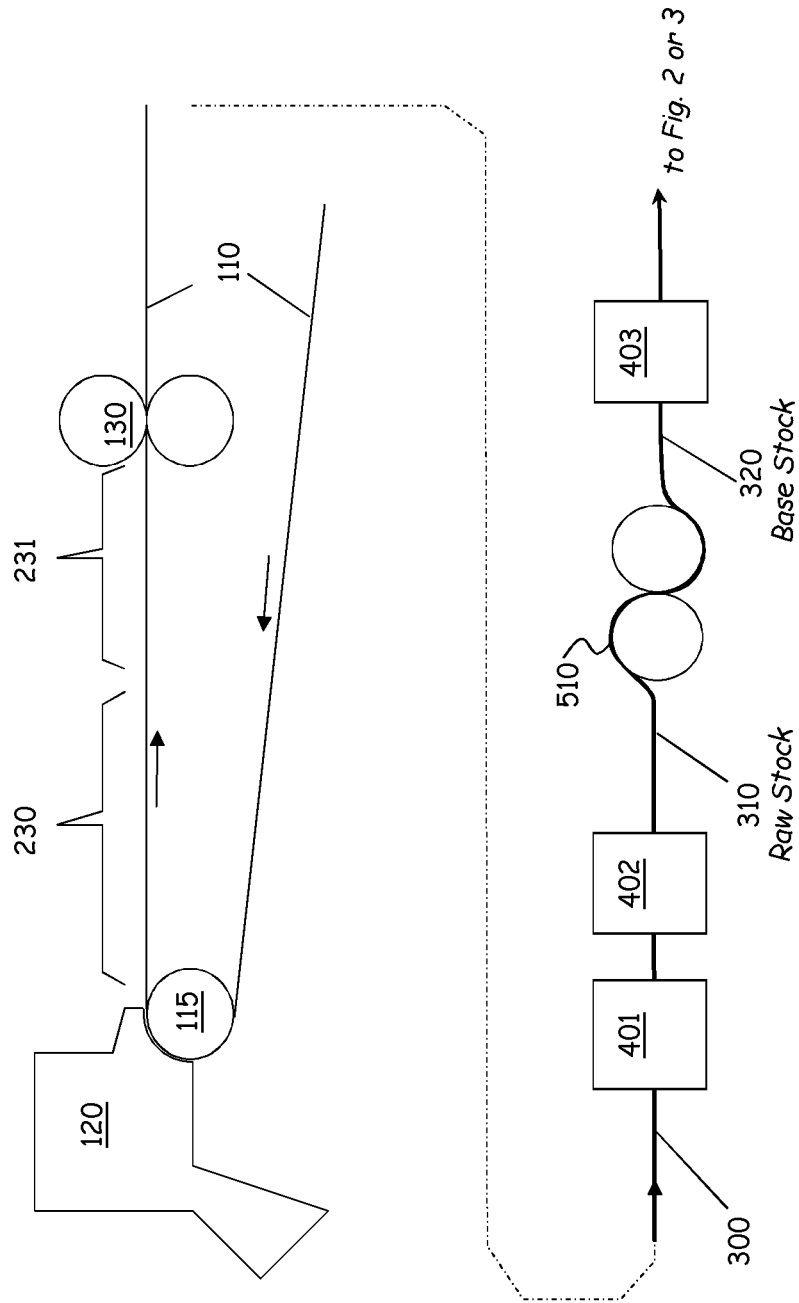
FIG. 1 illustrates a method for producing a base stock on a paperboard machine.
Figure 2:
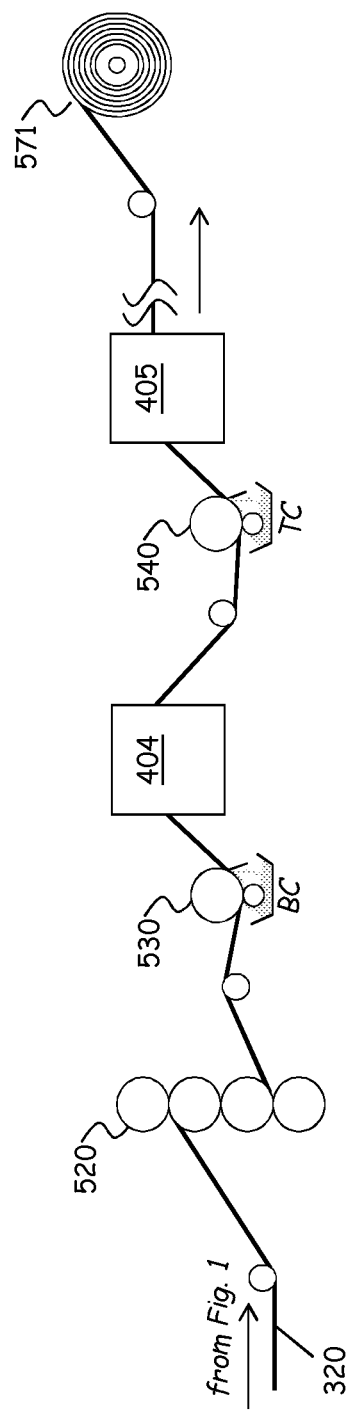
FIG. 2 illustrates a method for treating the base stock from FIG. 1 by applying coatings to one side on a paperboard machine.

FIG. 1 and FIG. 2 illustrate an exemplary on-paper machine method for coating one side of a paperboard web with two layers of aqueous coating. A forming wire 110 in the form of an endless belt passes over a breast roll 115 that rotates proximate to a headbox 120. The headbox provides an unbleached fiber slurry in water with a fairly low consistency (for example, about 0.5% solids) that passes onto the moving forming wire 110. During a first distance 230 water drains from the slurry and through the forming wire 110, forming a web 300 of wet fibers. The slurry during distance 130 may yet have a wet appearance as there is free water on its surface. At some point as drainage continues the free water may disappear from the surface, and over distance 231, water may continue to drain although the surface appears free from water.

Eventually the web is carried by a transfer felt or press felt through one or more pressing devices such as press rolls 130 that help to further dewatering the web, usually with the application of pressure, vacuum, and sometimes heat. After pressing, the still relatively wet web 300 is dried, for example using dryer or drying sections 401, 402 to produce a dry web ("raw stock") 310 which may then be run through a size press 510 that applies a surface sizing to produce a sized "base stock" 320 which may then be run through additional dryer sections 403 and (on FIG. 2) smoothing steps such as calendar 520.

The unbleached base stock 320 may then be run through one or more coaters. For example, coater 530 may apply a first coat ("BC") to a first side ("C1") of the web, and the first coat may be dried in one or more dryer sections 404. Coater 540 may apply an optional second coat ("TC") to the first side of the web, and the second coat may be dried in one or more dryer sections 405.

Figure 3:
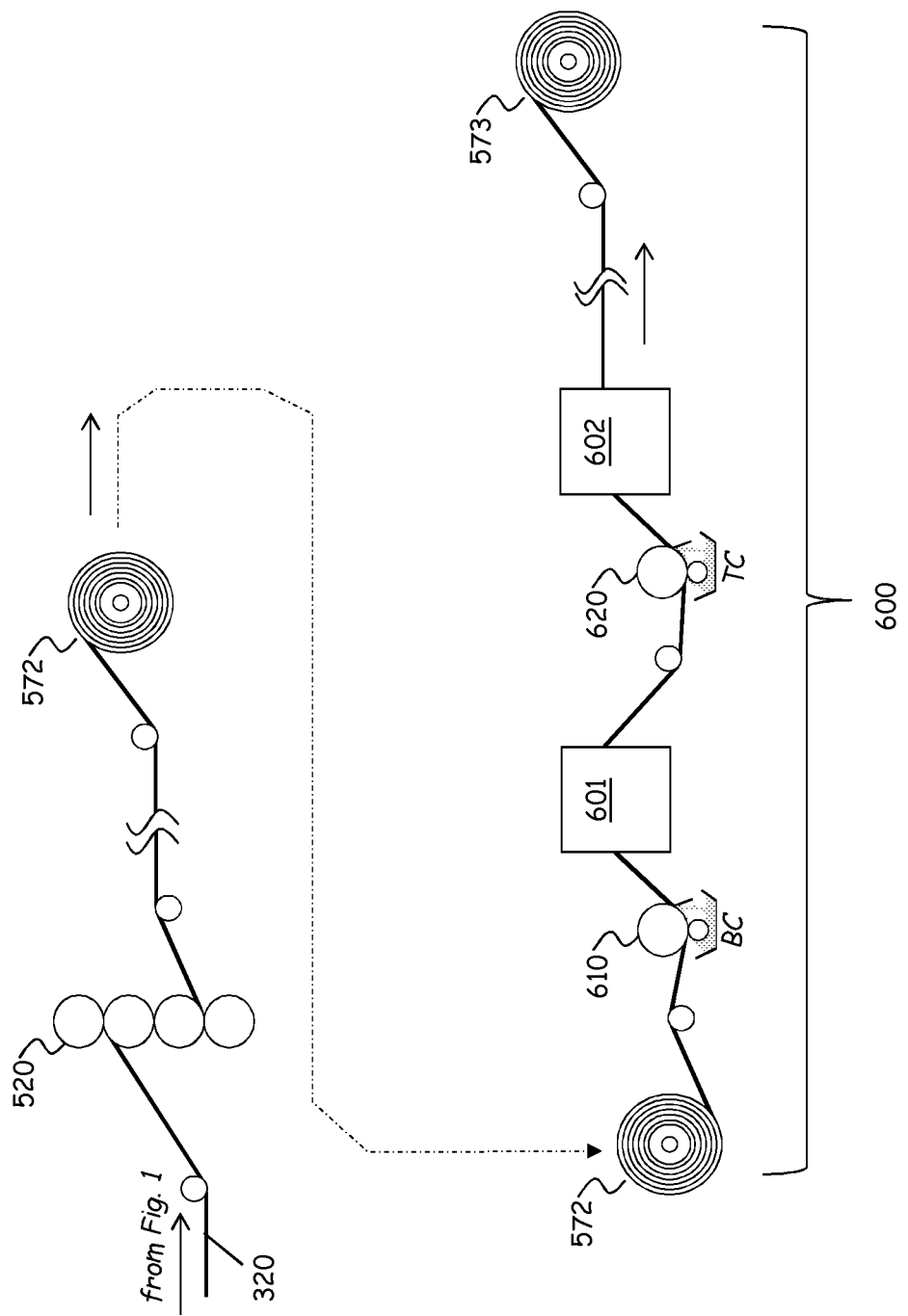
FIG. 3 illustrates a method for treating the base stock from FIG. 1 by applying coatings to one side on an off-machine coater.

Instead of applying coating by on-machine coaters as shown in FIG. 2, coating may be applied by an off-machine coater as shown in FIG. 3. In such cases, the paperboard having been produced on the paper machine and wound onto reel 572 may then be transported (as a reel or as smaller rolls) to an off-machine coater 600, where the paperboard is unwound from reel 572, given a first coating by coater 610, dried in dryer(s) 601, given an optional second coating by coater 620, dried in dryer(s) 602, optionally given further treatment (such as gloss calendaring) and then wound onto reel 573. An off-machine coater could instead apply a single coat to one side of the paperboard, or could apply a single coat to each side, or could apply more than one coat to either or both sides. Alternately some coating may be done on the paper machine, with additional coating done on an off-machine coater.

Various types of coating devices may be used. The coaters illustrated in FIGS. 2-3 are devices where a coating is held in a pan, transferred by a roll to the lower surface of the web (which may be either the first side or the second side depending on the web path), and then the excess coating scraped off by a blade as the web wraps partially around a backing roll. However other coater types may be used instead, including but not limited to curtain coater, air knife coater, rod coater, film coater, short-dwell coater, spray coater, and metering film size press.

Following the coaters, there may be additional equipment for further processing such as additional smoothening, for example gloss calendaring. Finally, the web is tightly wound onto a reel 570.

The general process of papermaking and coating having been outlined at a high level in the preceding description and with FIGS. 1-3, we now turn to the coatings of the present invention. Unbleached stock is commonly coated with pigmented coatings for the purpose of providing a smooth, white surface suitable for printing. One example of such a paperboard is CNK® paperboard manufactured by WestRock Company. While unbleached stock can be alternatively or additionally coated with materials to enhance oil, grease, or moisture resistance, typical aqueous barrier coatings often use specialty polymer(s), wax, and/or a higher polymer binder level (compared to conventional print coatings). These coatings can cause problems with repulpability of the coated paperboard because the coatings are usually difficult to breakdown to acceptable size or tend to form 'stickies' in paperboard making with the recycled fibers.

Furthermore, many barrier coatings give paperboard a tendency to 'block' (the layers stick together) either in the reel 570, 571, 572, 573 or after it is rewound into rolls. Particularly in the reel 570, there may be residual heat from the dryers, which may dissipate quite slowly because of the large mass of the reel. Higher temperatures may increase the tendency toward blocking.

It is known that paperboard coated with conventional printability coatings usually does not block, and usually is fully repulpable. It would be advantageous if non-blocking and fully repulpable coatings also provided at least some degree of barrier properties. However, conventional printability coatings do not provide satisfactory barrier properties. Their formulations have relatively low levels of binder so as to absorb rather than repel fluid (printing ink, for example).

Binder amounts in conventional printability coatings can range from 15-25 parts per 100 parts of pigment by weight for base coatings, and 10-20 parts per 100 parts pigment by weight for top coatings. Printing grades would tend to be in the lower half of these ranges. Limiting the binder amount in the top coating may allow printing inks or adhesives to absorb readily into the printability coating. Simply increasing the binder to improve barrier properties eventually interferes with printability and causes additional problems, including blocking and repulpability problems.

Similar blocking and repulpability problems exist with many aqueous barrier coatings that use specialty polymer(s) and/or a higher polymer binder level (compared to printability coatings), with the deleterious effect that the coated paperboard is not completely recyclable and tends to block at elevated temperature or pressure.

In any case, conventional printability coatings containing binder(s) and pigment(s) can be expected to have a high level of opacity. This characteristic is highly desirable if the paperboard is intended to provide a white substrate for printing. It is unsuitable for a packaging material intended to have a natural appearance.

Surprisingly, it has been found the inventive coatings disclosed in the present application provide a coated unbleached kraft paperboard that maintains its natural brown appearance even with pigment (e.g., clay) in the formulation. The resulting coated paperboard shows excellent oil holdout properties and significantly enhanced moisture vapor barrier properties. The paperboard does not block at elevated temperature and pressure, and it repulps similarly to or better than the corresponding printable-grade kraft paperboard. Moreover, the coatings use conventional pigments that are low-cost and readily available as coating materials for the paper or paperboard industry.

Conventional pigments are used in the present invention and may include, but are not limited to, kaolin clay, calcium carbonate, etc. Pigments used in the examples herein are given the following 'shorthand' designations:

| | |
|---|---|
| "Clay-A" | #2 clay, regular brightness, particle size 80-94% < 2 microns |
| "Clay-B" | #1 clay, high brightness, particle size 90-100% < 2 microns |
| "Clay-C" | platy clay with high-aspect ratio |
| "CaCO$_3$-A" | coarse ground calcium carbonate, particle size 60% < 2 microns |

For a binder in the coatings here, SBR latex and protein were used. The choice of binder in the examples is not meant to be limiting in any way, and may include without limitation at least one of styrene butadiene copolymer, protein, styrene acrylate copolymer, polyvinyl acetate, and vinyl acrylics copolymer.

Coatings were prepared according to the formulations shown in Table 1, which provides a list of major constituents in dry parts of the aqueous coating formulations used to achieve the oil and grease resistance without blocking or repulpability problems. Substantially no fluorochemical was used in the coatings. By "substantially no fluorochemical" is meant that fluorochemicals were not deliberately utilized, and that any amount present would have been at most trace amounts. Although fluorochemicals can be excluded in lab experiments, trace amounts of such materials might be present in some paper machine systems due to making various grades of product, or might be introduced into a papermaking system through recycling processes. Likewise, substantially no wax was used in the coatings, with "substantially no wax" having a similar meaning.

TABLE 1

Coating Formulations

|  | C-1 | C-2 | C-3 | C-4 | C-5 | C-6 | C-7 | C-8 | C-9 |
|---|---|---|---|---|---|---|---|---|---|
| Clay-A | 100 | | | | | | | | |
| Clay-B | | 100 | | | 100 | 100 | 100 | 100 | 100 |
| Clay-C | | | 100 | | | | | | |
| CaCO$_3$-A | | | | 100 | | | | | |
| SBR Latex | 32 | 32 | 32 | 32 | 35 | 17 | 23 | 27 | 36 |
| Protein | 3 | 3 | 3 | 3 | | 2 | 2 | 3 | 3 |
| Total Binder (parts per 100 parts of pigment) | 35 | 35 | 35 | 35 | 35 | 19 | 25 | 30 | 39 |

Paperboard samples were made using unbleached sulfate (kraft) substrate with a caliper of 14 pt (0.014"). The samples were coated on one side (herein termed the "coated side") using a pilot blade coater to apply a single coat or to apply a base coat and then a top coat. The pilot results are expected to be representative of results that might be achieved on a production paper machine or a production off-machine coater.

Test results for the formulations of Table 1 when applied as a single-pass coating are shown in Table 2, with a coat weight of 10.0-10.5 lbs per 3000 ft$^2$ selected for all samples. The samples C-2, C-3, C-4, C-5, and C-9 exhibited a natural appearance in which the brown fiber of the unbleached paperboard stock was clearly visible through the applied coatings, such that the coatings can be considered as having a substantially "transparent" or "translucent" appearance without noticeable whiteness. This is in contrast to the samples C-1, C-6, C-7, and C-8, all of which exhibited some degree of whiteness that prevented or detracted from a natural appearance of the board. Especially, the samples coated with C-6 and C-7 that contained relatively low binder levels (e.g., 19 or 25 parts per 100 parts of pigment) showed mottled whiteness of the coated surface. Compared with coatings (C-2, C-3, C-4) containing Clay-B, Clay-C, or CaCO$_3$, respectively, the coating (C-1) with Clay-A did show a whiter appearance.

The color of the samples was measured as L-a-b color space values using a Technidyne Brightimeter Micro S-5 equipment according to TAPPI standard T524, which are shown in Table 2. The a color and b color component values are shown graphically in FIG. 4, where it will be noted the samples having a natural appearance are all clustered in the upper right hand corner. Samples exhibiting an acceptable natural appearance had an L value within the color space of less than 72, preferably less than 62, and more preferably less than 60. Values of b for such samples were greater than 6, and preferably greater than 9.5.

The brightness of the samples was measured on a Technidyne Brightimeter Micro S-5 according to TAPPI standard T452, with the resulting values shown in Table 2. Brightness values for the samples exhibiting an acceptable natural appearance had value of less than 40, preferably less than 30, and more preferably less than 25.

The oil and grease resistance (OGR) of the samples was measured on the 'coated side' by the 3M kit test (TAPPI Standard T559 cm-02). With this test, ratings are from 1 (the least resistance to oil and grease) to 12 (excellent resistance to oil and grease penetration).

As shown in Table 2, the aqueous barrier coating samples C-2, C-3, C-4, C-5, and C-9 with a natural appearance gave 3M kit levels of 4.8 or greater, compared with a print grade CNK® control having a 3M kit rating less than 1. Moisture resistance of the coatings was evaluated by WVTR (water vapor transmission rate) at 38° C. and 90% relative humidity (TAPPI Standard T464 OM-12) and water Cobb (TAPPI Standard T441 om-04). WVTR was markedly decreased for the samples having relatively high levels of binder (i.e., in excess of 30 parts), as was the water Cobb rating. Samples coated with C-2, C-3, C-4, C-5, and C-9, all exhibiting a natural appearance, had WVTR values in a range of 189 to 379 g/m$^2$-d, indicating significantly improved moisture vapor barrier as compared with a WVTR of 1098 g/m$^2$-d for a print grade CNK® control at the same caliper (14 pt). It was noticed that the coating C-4 with CaCO$_3$-A as pigment showed the most resistance to liquid water with a 2-min water Cobb of 3.5 g/m$^2$, which was ten times better than the other samples with a natural appearance.

TABLE 2

Results for Coated Paperboard

|  | C-1 | C-2 | C-3 | C-4 | C-5 | C-6 | C-7 | C-8 | C-9 |
|---|---|---|---|---|---|---|---|---|---|
| Coat weight lb/3 msf | 10.0 | 10.4 | 10.2 | 10.5 | 10.3 | 10.2 | 10.5 | 10.3 | 10.0 |
| 3M kit | 2.4 | 5 | 5.8 | 5.8 | 6.6 | 0 | 1.6 | 3.4 | 4.8 |
| Oil Cobb-30 min g/m$^2$ | 2.7 | 0.7 | 0.6 | 0.7 | 0.6 | 6.1 | 2.6 | 1.7 | 0.9 |
| WVTR-38° C., 90% RH g/m$^2$-d | 376 | 301 | 189 | 309 | 379 | 1193 | 726 | 421 | 283 |
| Water Cobb-2 min g/m$^2$ | 36.6 | 37.6 | 39.6 | 3.5 | 37.8 | 58.0 | 53.4 | 51.4 | 34.6 |
| Blocking | 0 | 0 | 0 | 0 | 0 | 0 | 0 | 0 | 0 |
| L-a-b color * | 62.6-2.9-9.9 | 57.7-3.6-13.3 | 58.0-3.5-12.6 | 58.5-3.5-14.3 | 57.6-3.6-13.7 | 75.1-1.5-1.6 | 71.4-2.0-4.4 | 61.6-3.0-10.7 | 58.4-3.5-13.4 |
| Brightness** | 30.7 | 22.8 | 23.6 | 22.7 | 22.3 | 55.1 | 46.9 | 28.9 | 23.4 |
| Natural Appearance | light white | yes | yes | yes | yes | white mottle | white mottle | very light white | yes |

* The uncoated unbleached stock had L-a-b values of 55.5-3.8-15.1.
**The uncoated unbleached stock had a brightness value of 19.2.

In addition to 3M kit test, oil absorptiveness (oil Cobb) was used to quantify and compare the OGR performance (oil and grease resistance), which measures the mass of oil absorbed in a specific time, e.g., 30 minutes, by 1 square meter of coated paperboard. For each condition tested, the sample was cut to provide two pieces each 6 inch×6 inch square. Each square sample was weighed just before the test. Then a 4 inch×4 inch (area of 16 square inches or 0.0103 square meters) square of blotting paper saturated with peanut oil was put on the center of the test specimen (barrier side) and pressed gently to make sure the full area of oily blotting paper was contacting the coated surface. After 30-minutes as monitored by a stop watch, the oily blotting paper was gently removed using tweezers, and the excess amount of oil was wiped off from the coated surface using paper wipes (Kimwipes™). Then the test specimen was weighed again. The weight difference in grams before and after testing divided by the test area of 0.0103 square meters gave the oil Cobb value in grams/square meter Consistent with the 3M kit test results discussed above, the oil Cobb (30-minute exposure) values for the samples C-2, C-3, C-4, C-5, and C-9 with a natural appearance were lower than those for the samples C-1, C-6, C-7, and C-8 that exhibited some degree of whiteness. As a comparison, a print grade CNK® control (14 pt) was measured a 30-minute oil Cobb of 9.4 g/m². The barrier coated samples did not show any tendency toward blocking at elevated temperature and pressure.

Figure 5:
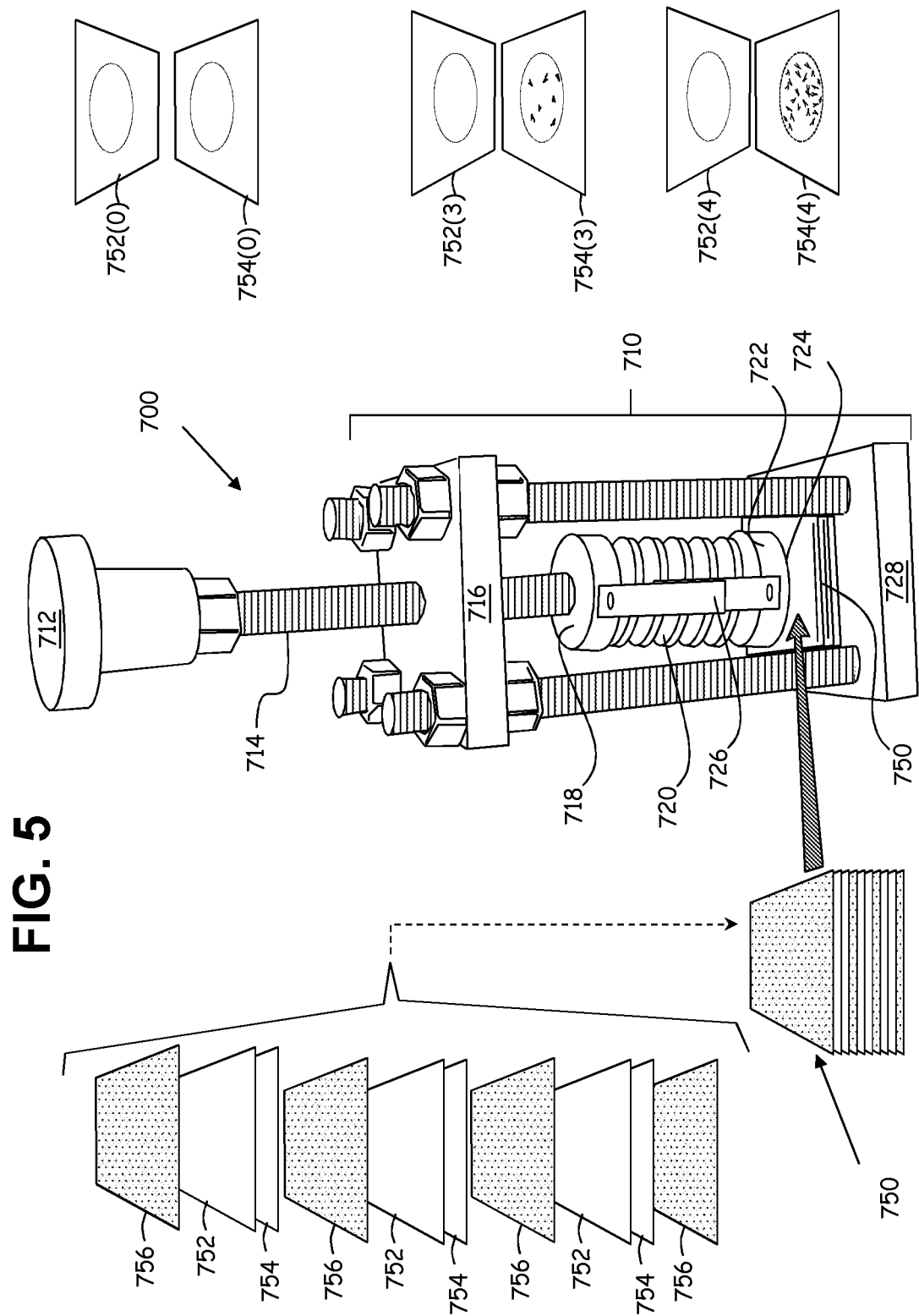
FIG. 5 shows a device and method for measuring blocking.

The blocking behavior of the samples was tested by evaluating the adhesion between the barrier coated side and the other uncoated side. A simplified illustration of the blocking test is shown in FIG. 5. The paperboard was cut into 2"×2" square samples. Several duplicates were tested for each condition, with each duplicate evaluating the blocking between a pair of samples 752, 754. (For example, if four duplicates were test, four pairs-eight pieces—would be used.) Each pair was positioned with the 'barrier-coated' side of one piece 752 contacting the uncoated side of the other piece 754. The pairs were placed into a stack 750 with a spacer 756 between adjacent pairs, the spacer being foil, release paper, or even copy paper. The entire sample stack was placed into the test device 700 illustrated in FIG. 5.

The test device 700 includes a frame 710. An adjustment knob 712 is attached to a screw 714 which is threaded through the frame top 716. The lower end of screw 714 is attached to a plate 718 which bears upon a heavy coil spring 720. The lower end of the spring 720 bears upon a plate 722 whose lower surface 724 has an area of one square inch. A scale 726 enables the user to read the applied force (which is equal to the pressure applied to the stack of samples through the one-square-inch lower surface 724).

The stack 750 of samples is placed between lower surface 724 and the frame bottom 728. The knob 712 is tightened until the scale 726 reads the desired force of 100 lbf (100 psi applied to the samples). The entire device 700 including samples is then placed in an oven at 50° C. for 24 hours. The device 700 is then removed from the test environment and cooled to room temperature. The pressure is then released and the samples removed from the device.

The samples were evaluated for tackiness and blocking by separating each pair of paperboard sheets. The results were reported as shown in Table 3, with a "0" rating indicating no tendency to blocking.

TABLE 3

Blocking Ratings

0 = samples fall apart without any force applied
1 = samples have a light tackiness but separate without fiber tear
2 = samples have a high tackiness but separate without fiber tear
3 = samples are sticky and up to 25% fiber tear or coat damage (area basis)
4 = samples have more than 25% fiber tear or coat damage (area basis)

Blocking damage is visible as fiber tear, which if present usually occurs with fibers pulling up from the non-barrier surface of samples 754. If the non-barrier surface was coated with a print coating, then blocking might also be evinced by damage to the print coating.

For example, in as symbolically depicted in FIG. 5, samples 752(0)/754(0) might be representative of a "0" blocking (no blocking). The circular shape in the samples indicates an approximate area that was under pressure, for instance about one square inch of the overall sample. Samples 752(3)/754(3) might be representative of a "3" blocking rating, with up to 25% fiber tear in the area that was under pressure, particularly in the uncoated surface of sample 754(3). Samples 752(4)/754(4) might be representative of a "4" blocking rating with more than 25% fiber tear, particularly in the uncoated surface of sample 754(4). The depictions in FIG. 5 are only meant to approximately suggest the percent damage to such test samples, rather than showing a realistic appearance of the samples.

A further series of samples were prepared using the coating formulation C-2 from Table 1. Paperboard samples made using unbleached sulfate (kraft) substrate with a caliper of 14 pt (0.014") were coated on one side (the "coated side") using a pilot blade coater to apply a base coat ("BC") of formulation C-2, and then for some samples, a pilot blade coater was used to apply a top coat ("TC") of formulation C-2. Test results for these samples are shown in Table 4. As before, the oil and grease resistance (OGR) of the samples was measured on the 'coated side' by the 3M kit test and oil Cobb (30 minute). Moisture vapor barrier was also evaluated by measuring WVTR of these samples.

TABLE 4

Results for Coated Paperboard

|  | C-2 | C-2/C-2 | C-2/C-2 |
| --- | --- | --- | --- |
| BC Coat weight lb/3 msf | 10.7 | 8.6 | 9.8 |
| TC Coat weight lb/3 msf |  | 6.2 | 4.7 |
| 3M kit | 6 | 12 | 12 |
| Oil Cobb-30 min g/m² | 0.6 | 2.2 | 1.0 |
| WVTR-38° C., 90% RH g/m²-d | 310 | 182 | 175 |
| Repulpability % accepts | 98.8 | 98.9 | 98.9 |
| Blocking | 0 | 0 | 0 |

Figure 4:
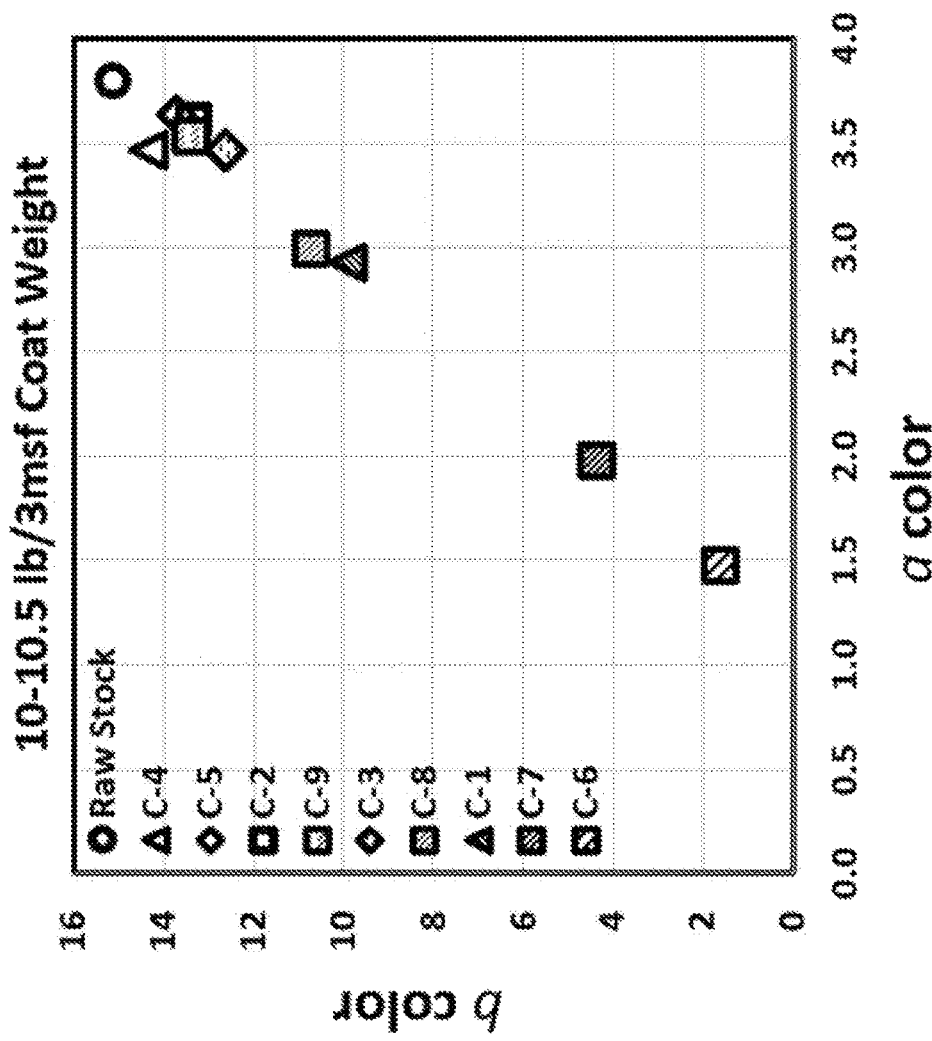
FIG. 4 is a graph of the a and b components of L-a-b color values for several samples.

Applying a two-pass coating should result in 3M kit levels of at least 10, and for the samples of FIG. 4, results of 12 were achieved. Although the sample with a one-pass coating showed a slightly lower 30-minute oil Cobb, it was noticed that the samples with a two-pass coating had very few surface oil staining spots after the oil Cobb test; however, the sample with a one-pass coating showed a lot oil staining after the oil Cobb test. As seen in Table 4, WVTR was significantly improved for the two-pass coating.

For each of the samples in Table 4, the coated paperboard had a natural appearance.

Repulpability of the samples in Table 4 was tested using an AMC Maelstrom repulper. 110 grams of coated paperboard, cut into 1"×1" squares, was added to the repulper containing 2895 grams of water (pH of 6.5±0.5, 50° C.), soaked for 15 minutes, and then repulped for 30 minutes. 300 mL of the repulped slurry was then screened through a vibrating flat screen (0.006" slot size). Rejects (caught by the screen) and fiber accepts were collected, dried and weighed. The percentage of accepts was calculated based on the weights of accepts and rejects, with 100% being complete repulpability. The samples all achieved repulpability of 98.8% accepts, as compared with 96.3% achieved using the same repulping test performed on a control print grade sample of coated unbleached kraft paperboard.

Figure 6:
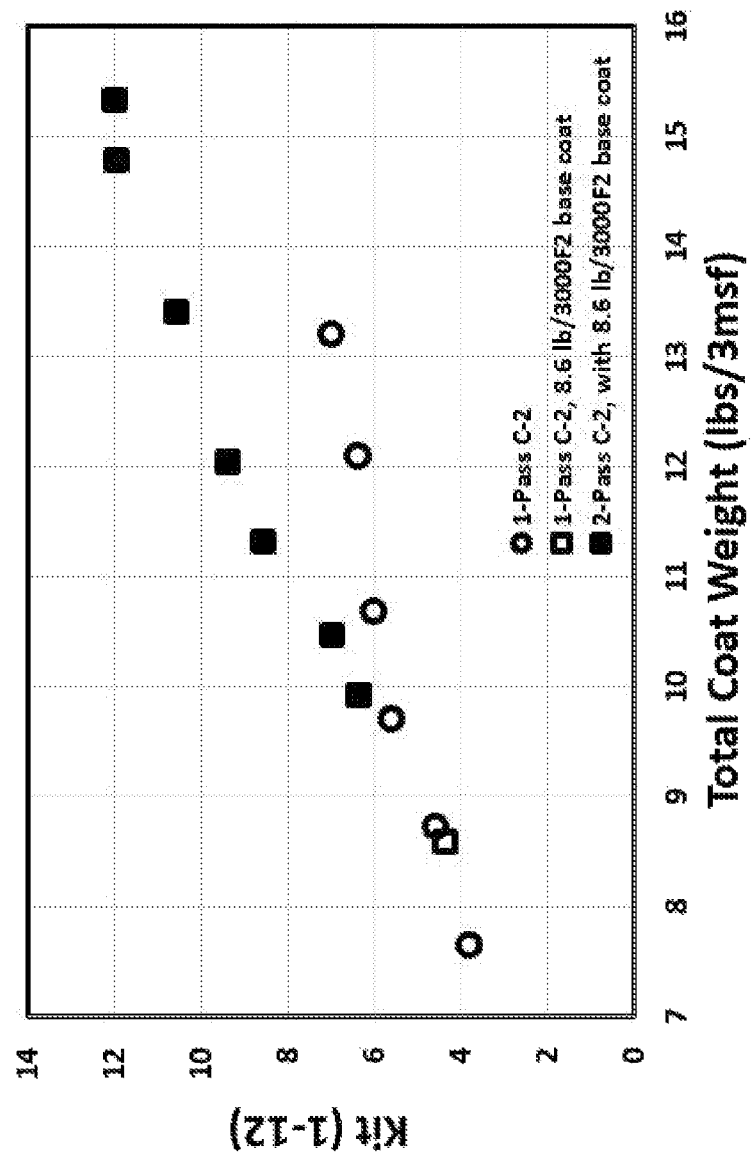
FIG. 6 is a graph of oil/grease resistance (3M kit level) vs. coat weight.
Figure 7:
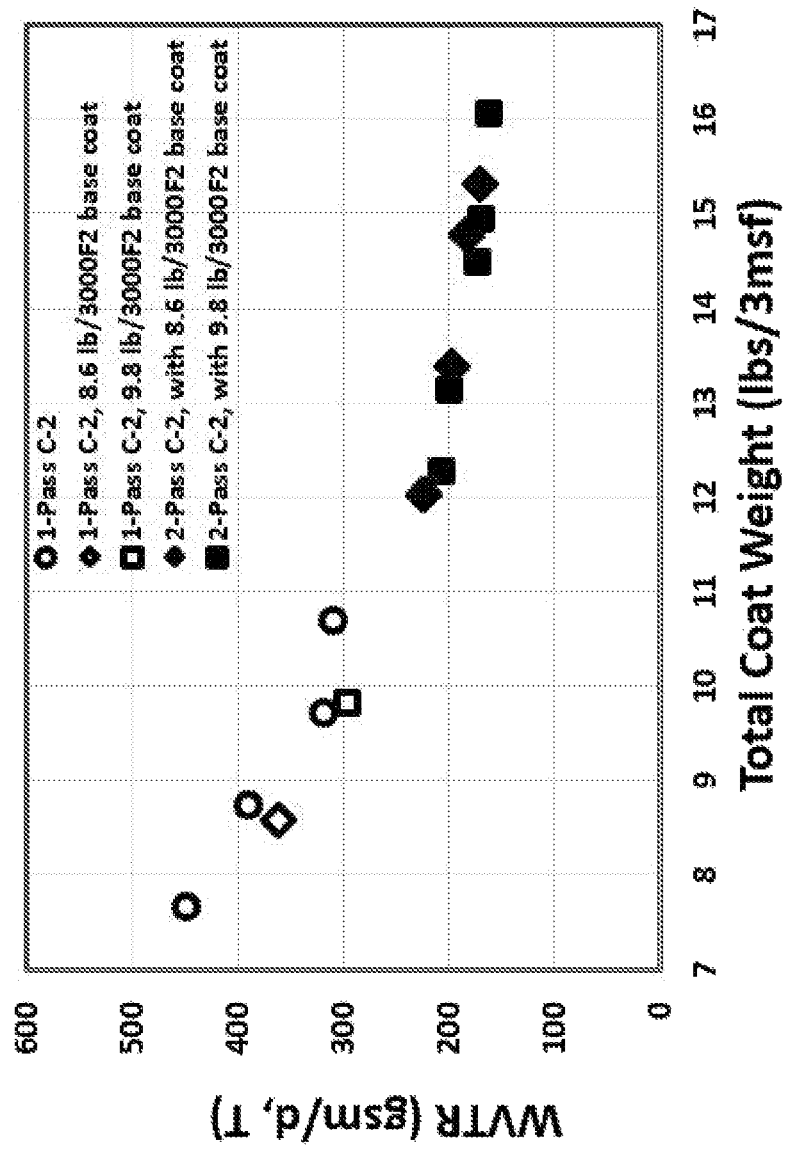
FIG. 7 is a graph of moisture resistance (WVTR) vs. coat weight.

Additional samples of coating formulation C-2 were prepared, with the coating applied in one-pass and two-passes. In each case, the base coating was applied at a coat weight of 8.6 or 9.8 lb/3 msf, with the top coat applied at various coat weights. Each sample exhibited a natural appearance for all coat weights shown. The effect of total coat weight on 3M kit values can be seen by reference to FIG. 6, while the effect of total coat weight on WVTR can be seen by reference to FIG. 7. As shown in FIG. 6, 3M kit level increased with coat weight for both one-pass and two-pass coatings; however, two-pass coatings showed higher kit levels than one-pass coatings at a similar total coat weight. Both one-pass and two-pass coatings followed a similar trend of WVTR over total coat weight, as indicated in FIG. 7.

As shown in Tables 1, 2, and 4, a satisfactory natural appearance, along with good oil, grease and moisture resistance, can be obtained with a total binder to pigment ratio (parts of binder, by weight, to 100 parts of pigment) of the coating formulations in a range of 30 to 50, and preferably 35 to 45. This is more than the binder to pigment ratio for typical printability coatings (where rapid absorption of ink is desired) and less than the binder to pigment ratio of typical barrier coatings. Moreover, good results are achieved using a coating comprised at least in part of SBR latex.

In summary, the results show that paperboard having a natural appearance with good oil, grease and moisture resistance is achieved by coating with conventional coating materials. The tests described above used a blade coater to apply coating. As previously discussed, various types of coating devices may be used.

Once given the above disclosure, many other features, modifications or improvements will become apparent to the skilled artisan. Such features, modifications or improvements are, therefore, considered to be a part of this invention, the scope of which is to be determined by the following claims.

While preferred embodiments of the invention have been described and illustrated, it should be apparent that many modifications to the embodiments and implementations of the invention can be made without departing from the spirit or scope of the invention. It is to be understood therefore that the invention is not limited to the particular embodiments disclosed (or apparent from the disclosure) herein, but only limited by the claims appended hereto.

The invention claimed is:

1. A coated paperboard comprising:
an unbleached paperboard substrate having a first side and a second side; and
a first coating in contact with the first side, the first coating having a coat weight from about 6 to 14 lbs per 3000 ft$^2$ and comprising binder and pigment having a binder to pigment ratio in a range of 30 to 50 parts binder per 100 parts pigment, by weight, and substantially no fluorochemical or wax;
wherein the coated paperboard provides barrier properties to at least one of oil, grease, and moisture;
wherein the coated paperboard is repulpable to the extent that after repulping the percentage accepts is at least 95%; and
wherein the coated paperboard has a natural appearance wherein the substrate fibers are substantially visible through the first coating.

2. The coated paperboard of claim 1, wherein the binder to pigment ratio in the first coating is in a range of 35 to 45 parts binder per 100 parts pigment, by weight.

3. The coated paperboard of claim 1, wherein the binder in the first coating comprises at least one of styrene butadiene copolymer, protein, styrene acrylate copolymer, polyvinyl acetate, and vinyl acrylics copolymer.

4. The coated paperboard of claim 1, further comprising a second coating applied over the first coating, the second coating having a coat weight such that the total coat weight of the first and second coatings is about 10 to 20 lbs per 3000 ft$^2$ and comprising binder and pigment, and substantially no fluorochemical or wax.

5. The coated paperboard of claim 4, wherein the binder to pigment ratio in the second coating is in a range of 30 to 50 parts binder per 100 parts pigment, by weight.

6. The coated paperboard of claim 4, wherein the binder in the second coating comprises at least one of styrene butadiene copolymer, protein, styrene acrylate copolymer, polyvinyl acetate, and vinyl acrylics copolymer.

7. The coated paperboard of claim 4, wherein the 3M kit test value is at least 10.

8. The coated paperboard of claim 1, wherein the 3M kit test value is at least 4.

9. The coated paperboard of claim 1, wherein the coated paperboard has a 30-minute oil Cobb test of at most 3 grams per square meter.

10. The coated paperboard of claim 9, wherein the coated paperboard has a 30-minute oil Cobb test of at most 1 gram per square meter.

11. The coated paperboard of claim 1, wherein the coated paperboard has a water vapor transmission rate of less than 500 grams per square meter per day.

12. The coated paperboard of claim 11, wherein the coated paperboard has a water vapor transmission rate of less than 300 grams per square meter per day.

13. The coated paperboard of claim 11, wherein the coated paperboard has a water vapor transmission rate of less than 200 grams per square meter per day.

14. The coated paperboard of claim 1, having no tendency toward blocking after being held for 24 hours at 50° C. at a pressure of 100 psi.

15. The coated paperboard of claim 1, wherein the coated paperboard is repulpable to the extent that after repulping the percentage accepts is at least 98%.

16. The coated paperboard of claim 1, wherein the pigment comprises at least one of clay and calcium carbonate.

17. The coated paperboard of claim 16, wherein the pigment comprises a clay having a particle size of 90-100%<2 microns.

18. The coated paperboard of claim 16, wherein the pigment comprises a platy clay.

19. The coated paperboard of claim 16, wherein the pigment comprises ground calcium carbonate having a particle size of at least 60%<2 microns.

20. A coated paperboard comprising:
an unbleached paperboard substrate having a first side and a second side;
a first coating in contact with the first side, the first coating having a coat weight from about 6 to 14 lbs per 3000 ft$^2$ and comprising binder and pigment having a binder to pigment ratio in a range of 30 to 50 parts binder per 100 parts pigment, by weight, and substantially no fluorochemical or wax;
wherein the coated paperboard provides barrier properties to at least one of oil, grease, and moisture;
wherein the coated paperboard is repulpable to the extent that after repulping the percentage accepts is at least 95%; and
wherein the first side of the coated paperboard has an L-a-b color space value in which L is less than 72.

21. The coated paperboard of claim 20, wherein L is less than 62.

22. The coated paperboard of claim 20, wherein L is less than 60.

23. The coated paperboard of claim 20, further comprising a second coating applied over the first coating, the second coating having a coat weight such that the total coat weight of the first and second coatings is about 10 to 20 lbs per 3000 ft$^2$ and comprising binder and pigment, and substantially no fluorochemical or wax.

24. A coated paperboard comprising:
an unbleached paperboard substrate having a first side and a second side;
a first coating in contact with the first side, the first coating having a coat weight from about 6 to 14 lbs per 3000 ft$^2$ and comprising binder and pigment having a binder to pigment ratio in a range of 30 to 50 parts binder per 100 parts pigment, by weight, and substantially no fluorochemical or wax;
wherein the coated paperboard provides barrier properties to at least one of oil, grease, and moisture;
wherein the coated paperboard is repulpable to the extent that after repulping the percentage accepts is at least 95%; and
wherein the first side of the coated paperboard has an L-a-b color space value in which b is greater than 6.

25. The coated paperboard of claim 24, wherein b is greater than 9.5.

26. The coated paperboard of claim 24, further comprising a second coating applied over the first coating, the second coating having a coat weight such that the total coat weight of the first and second coatings is about 10 to 20 lbs per 3000 ft$^2$ and comprising binder and pigment, and substantially no fluorochemical or wax.

* * * * *